US008383279B2

(12) United States Patent
Naganuma

(10) Patent No.: US 8,383,279 B2
(45) Date of Patent: Feb. 26, 2013

(54) FUEL CELL SYSTEM AND METHOD FOR CALCULATING CIRCULATION RATIO IN THE SAME

(75) Inventor: Yoshiaki Naganuma, Nisshin (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 1127 days.

(21) Appl. No.: 12/085,905

(22) PCT Filed: Apr. 27, 2007

(86) PCT No.: PCT/JP2007/059539
§ 371 (c)(1),
(2), (4) Date: Jun. 2, 2008

(87) PCT Pub. No.: WO2007/129719
PCT Pub. Date: Nov. 15, 2007

(65) Prior Publication Data
US 2009/0258260 A1 Oct. 15, 2009

(30) Foreign Application Priority Data
May 10, 2006 (JP) ................. 2006-132004

(51) Int. Cl.
*H01M 8/04* (2006.01)
*H01M 8/18* (2006.01)

(52) U.S. Cl. ........ 429/433; 429/400; 429/408; 429/415; 429/454; 429/515

(58) Field of Classification Search .......... 429/415, 429/400, 408, 433, 454, 515
See application file for complete search history.

(56) References Cited

U.S. PATENT DOCUMENTS

| 6,936,359 | B2* | 8/2005 | Kobayashi et al. | 429/415 |
| 2003/0148167 | A1* | 8/2003 | Sugawara et al. | 429/34 |
| 2004/0131902 | A1* | 7/2004 | Frank et al. | 429/21 |
| 2004/0180249 | A1* | 9/2004 | Pham et al. | 429/33 |
| 2005/0106445 | A1* | 5/2005 | Mitchell et al. | 429/38 |

(Continued)

FOREIGN PATENT DOCUMENTS

| JP | 06-325780 A | 11/1994 |
| JP | 9-180743 A | 7/1997 |
| JP | 2005-93110 A | 4/2005 |
| JP | 2005-129312 A | 5/2005 |

(Continued)

OTHER PUBLICATIONS

Federal Register, vol. 76, No. 27, pp. 7162-7175, issued Feb. 9, 2011, which details Supplementary Examination Guidelines for Determining Compliance with 35 U.S.C. 112 and for Treatment of Related Issues in Patent Applications.*

*Primary Examiner* — Ula C Ruddock
*Assistant Examiner* — Amanda Barrow

(57) ABSTRACT

There are disclosed a fuel cell system capable of inhibiting freezing at a joining part of a supply gas and a circulation gas during a system operation, and a method for calculating circulation ratio in the system. In the fuel cell system of the present invention, the circulation gas discharged from a fuel cell meets the supply gas from a gas supply source to be supplied to the fuel cell, and a flow rate of the circulation gas with respect to that of the supply gas is set in consideration of condensation latent heat of water vapor in the circulation gas. The flow rate of the circulation gas with respect to that of the supply gas can be set by heat balance calculation at the joining part in consideration of the condensation latent heat.

8 Claims, 3 Drawing Sheets

U.S. PATENT DOCUMENTS

| | | | |
|---|---|---|---|
| 2005/0277005 A1* | 12/2005 | Itou | 429/24 |
| 2006/0046108 A1* | 3/2006 | Milacic | 429/17 |
| 2006/0093879 A1* | 5/2006 | Yang et al. | 429/17 |
| 2006/0210853 A1* | 9/2006 | Fukuda | 429/23 |
| 2007/0009772 A1* | 1/2007 | Iio | 429/13 |
| 2007/0031718 A1* | 2/2007 | Fujimura et al. | 429/34 |
| 2007/0054165 A1* | 3/2007 | Yoshida et al. | 429/23 |
| 2007/0077472 A1* | 4/2007 | Uehara et al. | 429/25 |
| 2007/0128481 A1* | 6/2007 | Kanno | 429/22 |

FOREIGN PATENT DOCUMENTS

| | | |
|---|---|---|
| JP | 2005-235462 A | 9/2005 |
| JP | 2005-332676 A | 12/2005 |
| JP | 2005-346950 A | 12/2005 |
| JP | 2006-134743 A | 5/2006 |
| JP | 2006-164731 A | 6/2006 |
| WO | PCT/JP2004/05158 * | 12/2004 |
| WO | WO 2005/041333 * | 5/2005 |

* cited by examiner

FUEL CELL SYSTEM AND METHOD FOR CALCULATING CIRCULATION RATIO IN THE SAME

This is a 371 national phase application of PCT/JP2007/059539 filed 27 Apr.2007, which claims priority of Japanese Patent Application No. 2006-132004 filed 10May 2006, the contents of which are incorporated herein by reference.

TECHNICAL FIELD

The present invention relates to a fuel cell system where a gas discharged from a fuel cell meets a gas to be supplied to the fuel cell, and a method for calculating circulation ratio in the system.

BACKGROUND ART

Heretofore, a fuel cell system has broadly been known where a hydrogen off-gas discharged from a fuel cell meets a hydrogen gas discharged from a high pressure hydrogen tank to be supplied to the fuel cell again. In this fuel cell system, halfway along a supply path extending from the high pressure hydrogen tank to the fuel cell, a circulation path for returning the hydrogen off-gas to the supply path is connected.

In general, since water is produced by an electrochemical reaction in the fuel cell, the hydrogen off-gas contains much water vapor. Therefore, below a freezing point after stopping the system, the water vapor in the hydrogen off-gas is condensed in the circulation path and the like, and condensed water might freeze. To solve the problem, in a fuel cell system disclosed in Japanese Patent Application Laid-Open No. 2005-93110, a pressure in the circulation path or the like is raised after stopping the system, whereby a solidifying point of water is lowered to inhibit the freezing in the circulation path.

DISCLOSURE OF THE INVENTION

In addition, a temperature of a hydrogen gas in a high pressure hydrogen tank drops owing to insulation expansion by gas consumption. When an operation of a fuel cell system (hereinafter sometimes referred to as the "system operation") is performed at an outside air temperature below a freezing point, the hydrogen gas below the outside air temperature meets a hydrogen off-gas. Therefore, at a joining part, water vapor in the hydrogen off-gas is cooled, and can finally freeze. However, in the conventional fuel cell system, the freezing during the system operation is not considered, and further improvement is demanded.

An object of the present invention is to provide a fuel cell system capable of inhibiting freezing at a joining part of a gas to be supplied to a fuel cell and a gas to be discharged from the fuel cell during a system operation, and a method for calculating circulation ratio in the system.

To achieve the above object, in a fuel cell system of the present invention, a circulation gas discharged from a fuel cell meets a supply gas from a gas supply source to be supplied to the fuel cell. Moreover, a flow rate of the circulation gas with respect to that of the supply gas (this ratio will hereinafter be referred to as the "circulation ratio") is set in consideration of condensation latent heat of water vapor in the circulation gas.

Also, another fuel cell system of the present invention comprises a fuel cell, a gas supply source of a supply gas, a supply path for supplying the supply gas from the gas supply source to the fuel cell, a circulation path for returning a circulation gas discharged from the fuel cell to the supply path, and a joining part at which the supply gas meets the circulation gas. Moreover, the circulation ratio is set in consideration of condensation latent heat of water vapor in the circulation gas.

According to such a constitution, to set the circulation ratio, the condensation latent heat of the water vapor included in the circulation gas is considered. In consequence, the circulation gas can meet the supply gas so that the water vapor in the combined circulation gas is not cooled or frozen by the supply gas. Therefore, during the system operation, the freezing at the joining part of the supply gas and the circulation gas can be inhibited. An external heater for exclusive use in inhibiting the freezing and the like do not have to be disposed at the joining part.

Preferably, the gas supply source is a source of a fuel system, and the supply gas and the circulation gas are supplied to a fuel electrode of the fuel cell. In consequence, in a state in which the freezing is inhibited, the circulation gas of the fuel system can be circulated and supplied to the fuel electrode of the fuel cell.

The "supply gas" means a concept including a fuel gas typified by a hydrogen gas and a hydrogen-rich fuel gas in a case where a reforming treatment is performed. The "supply gas" is mainly a gas containing the hydrogen gas, but may be a gas (e.g., a CNG) other than the hydrogen gas. The "circulation gas" mainly includes a hydrogen off-gas and water vapor discharged from the fuel cell. In addition, the "circulation gas" includes, for example, a nitrogen gas cross-leaking in the fuel cell in addition to the hydrogen off-gas and the water vapor.

Preferably, the circulation ratio is set by calculation of heat balance at the joining part of the circulation gas and the supply gas in consideration of the condensation latent heat. In consequence, the heat balance at the joining part can more correctly be calculated. Moreover, the circulation ratio is set based on this calculation result, so that the freezing at the joining part can be inhibited.

Preferably, the circulation ratio is set in consideration of the condensation latent so that a temperature of a combined gas constituted after combining the supply gas and the circulation gas is higher than a predetermined temperature. In consequence, the circulation ratio is set so that, for example, the temperature of the combined gas is higher than a temperature at which water freezes, so that the freezing after the combining can be inhibited.

More preferably, the predetermined temperature is water solidifying point at a pressure of the combined gas or more. In consequence, since the combined gas reaches a temperature higher than a temperature at which water starts to freeze, the freezing after the combining can further be inhibited.

Here, when the pressure of the combined gas is higher than 760 mmHG, the solidifying point of water drops below 0° C. Therefore, in a case where the pressure of the combined gas is higher than 760 mmHG, when the circulation ratio is set so that the temperature of the combined gas is higher than 0° C., the circulation ratio is set on a safety side from a viewpoint of the inhibition of the freezing after the combining. Therefore, in one preferable configuration, the predetermined temperature may be 0° C.

Preferably, a lower limit value of the circulation ratio is set in consideration of the condensation latent heat. The temperature of the circulation gas during the system operation rises owing to power generation of the fuel cell, but when the flow rate of the circulation gas is lower than that of the supply gas, the water vapor after the gases combine each other might be condensed to freeze. Therefore, the lower limit value can be set to the circulation ratio to inhibit the freezing after the combining.

Preferably, the fuel cell system of the present invention further comprises a circulation device capable of controlling the flow rate of the circulation gas to be fed to the joining part of the supply gas and the circulation gas. According to such a constitution, the circulation device can easily control the flow rate of the circulation gas.

More preferably, the circulation device may vary the circulation ratio based on at least one of a temperature of the supply gas, a pressure of the circulation gas and an outside air temperature.

Preferably, the fuel cell system of the present invention further comprises a supply path extending from the gas supply source to a gas inlet, and a circulation path extending from the gas outlet of the fuel cell to the joining part between the circulation path and the supply path.

To achieve the above object, a method for calculating circulation ratio in a fuel cell system of the present invention is a method of calculating a circulation ratio in the fuel cell system where a circulation gas discharged from a fuel cell meets a supply gas from a gas supply source to be supplied to the fuel cell. The method comprises the step of calculating heat balance at a joining part of the circulation gas and the supply gas in consideration of condensation latent heat of water vapor in the circulation gas, and setting the circulation ratio based on the calculation result.

According to this constitution, the circulation ratio can be set so that the water vapor in the circulation gas after joined is not cooled or frozen by the supply gas. In consequence, during the operation of the fuel cell system, the freezing at the joining part can be inhibited.

To achieve the above object, another fuel cell system of the present invention comprises a joining part at which a fuel gas to be supplied from a high pressure tank to a fuel cell meets a fuel gas to be discharged from the fuel cell. Moreover, the fuel cell system is set so as to change a ratio of a flow rate of the fuel gas to be supplied from the high pressure tank to the fuel cell with respect to that of the fuel gas to be discharged from the fuel cell, when a water content freezes at the joining part or when the freezing is expected.

According to this constitution, when the water content freezes at the joining part, the ratio of the fuel gas can be changed to, for example, a ratio as to unfreeze the frozen water content. When the freezing at the joining part is expected, the ratio of the fuel gas can be changed so that the water content does not freeze. Therefore, during the system operation, the freezing at the joining part can be inhibited.

In this case, it is preferable that the ratio is determined based on a load of the fuel cell and a state of the fuel gas to be supplied from the high pressure tank to the fuel cell.

BEST MODE FOR CARRYING OUT THE INVENTION

A fuel cell system and a method for calculating circulation ratio in the system according to a preferable embodiment of the present invention will hereinafter be described with reference to the accompanying drawings.

Figure 1:
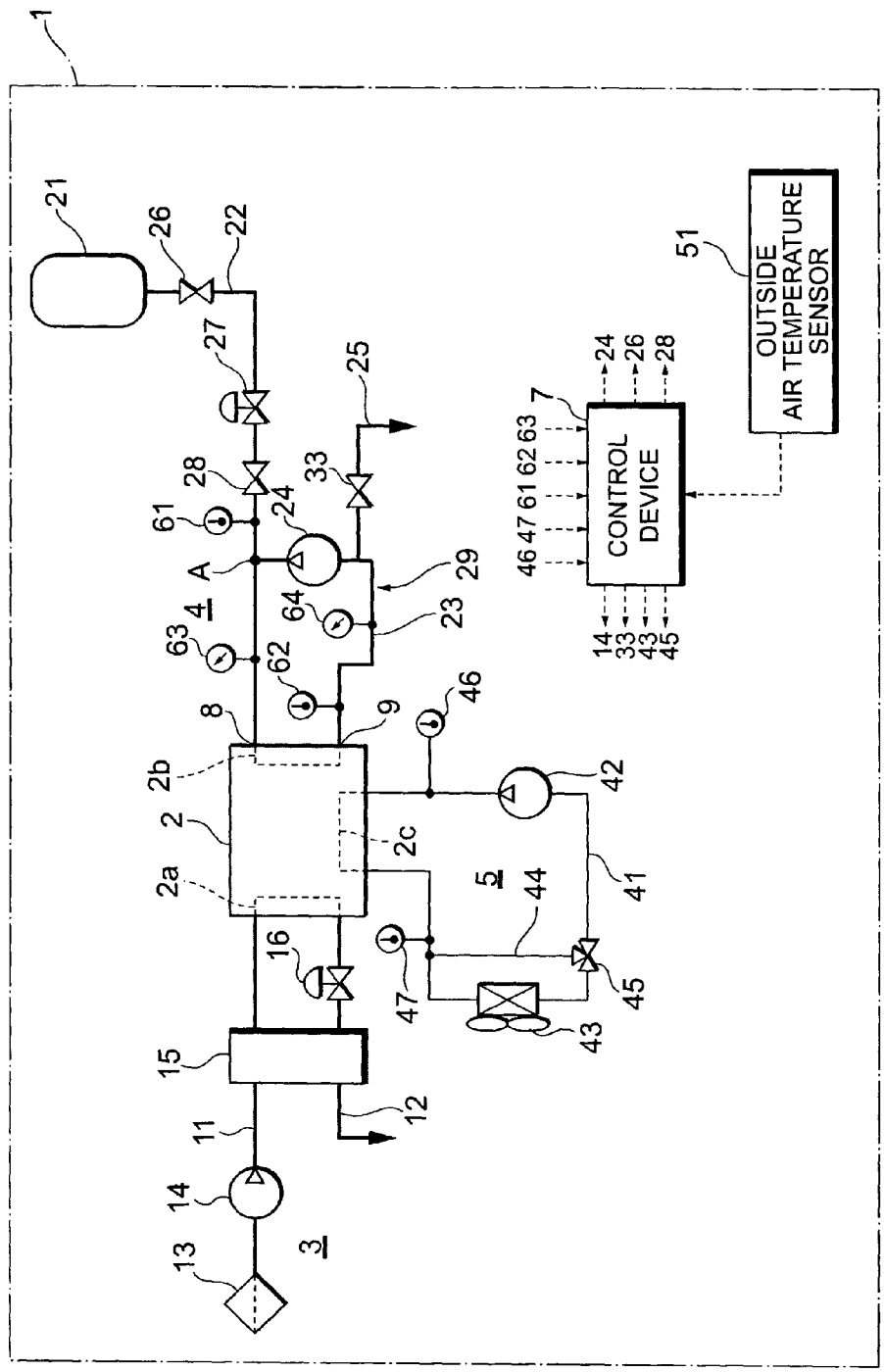
FIG. 1 is a constitution diagram of a fuel cell system according to the present invention.

As shown in FIG. 1, a fuel cell system 1 includes a fuel cell 2, an oxide gas piping system 3, a fuel gas piping system 4, a refrigerant piping system 5 and a control device 7. The fuel cell system 1 is mounted on a mobile body such as a vehicle, and supplies electric power to a power source of the vehicle.

The fuel cell 2 has a stack structure which is constituted of, for example, a solid polymer electrolytic type and in which a large number of single cells are laminated. Each single cell has an air electrode on one surface of an electrolyte formed of an ion exchange film, a fuel electrode on the other surface of the electrolyte, and a pair of separators arranged so as to sandwich the air electrode and the fuel electrode therebetween from opposite sides. An oxide gas is supplied to an oxide gas channel 2a of one of the separators, and a fuel gas is supplied to a fuel gas channel 2b of the other separator. The fuel cell 2 generates the electric power owing to electrochemical reaction between the supplied fuel gas and the supplied oxide gas. The electrochemical reaction in the fuel cell 2 is a heat generating reaction, and a temperature of the fuel cell 2 of the solid polymer electrolytic type is about 60 to 70° C.

The oxide gas piping system 3 supplies air (oxygen) as the oxide gas to the fuel cell 2. The oxide gas piping system 3 has a supply path 11 and an exhaust path 12. The oxide gas to be supplied to the fuel cell 2 flows through the supply path 11. The supply path 11 is provided with a compressor 14 which takes in the oxide gas via a filter 13, and a humidifier 15 which humidifies the oxide gas to be fed under pressure by the compressor 14. An oxide off-gas discharged from the fuel cell 2 flows through the exhaust path 12. The oxide off-gas is passed through a back pressure regulation valve 16, subjected to water content exchange in the humidifier 15, and then finally discharged as an exhaust gas from the system to the atmosphere.

The fuel gas piping system 4 supplies a hydrogen gas as the fuel gas to the fuel cell 2. The fuel gas piping system 4 has a hydrogen gas supply source 21, a supply path 22, a circulation path 23, a pump 24 and a purge path 25. The hydrogen gas supply source 21 is constituted of, for example, a high pressure tank, a hydrogen occlusion alloy and the like, and constituted so that, for example, 35 MPa or 70 MPa of hydrogen gas can be stored.

The hydrogen gas to be supplied from the hydrogen gas supply source 21 to the fuel cell 2 flows through the supply path 22. An upstream end of the supply path 22 communicates with the hydrogen gas supply source 21, and a downstream end thereof communicates with a fuel gas inlet 8 of the fuel cell 2. When an original valve 26 of the hydrogen gas supply source 21 is opened, the hydrogen gas flows out to the supply path 22. A pressure of the hydrogen gas is finally reduced to, for example, about 200 kPa by pressure reduction valves such as a pressure regulation valve 27 to supply the gas to the fuel gas channel 2b via the fuel gas inlet 8. It is to be noted that a supply pressure of the hydrogen gas to the fuel cell 2 is regulated based on a required output (load) of the fuel cell 2. The supply path 22 is provided with a shutoff valve 28 on an upstream side of a joining part A.

The circulation path 23 returns the circulation gas discharged from the fuel cell 2 to the joining part A between the circulation path and the supply path 22. An upstream end of the circulation path 23 communicates with a fuel gas outlet 9 of the fuel cell 2, and a downstream end thereof communicates with the supply path 22 at the joining part A. A channel of a circulation system 29 is constituted by allowing the circulation path 23, a downstream channel of the joining part A of the supply path 22 and the fuel gas channel 2b to communicate with one another in order.

Here, a "supply gas", a "circulation gas" and a "combined gas" for use in the following description are defined as follows.

The "supply gas" is the fuel gas to be supplied from the hydrogen gas supply source 21 to the fuel cell 2, and is here the hydrogen gas which flows through a portion of the supply path 22 from the hydrogen gas supply source 21 to the joining part A. It is to be noted that the supply gas is not limited to the hydrogen gas having a purity of 100% in the high pressure tank, and may be a hydrogen-rich fuel gas in a case where the gas is to be subjected to, for example, a reforming treatment.

The "circulation gas" is the fuel gas to be discharged from the fuel cell 2, and is here a gas flowing through the circulation path 23 from the fuel gas outlet 9 of the fuel cell 2 to the joining part A. The circulation gas is the hydrogen gas (hereinafter sometimes referred to as a hydrogen off-gas) discharged mainly from the fuel cell 2, and is a gas including water vapor and a nitrogen gas. The water vapor is obtained mainly by evaporating produced water produced by a power generating reaction of the fuel cell 2, and is included in the circulation gas. The nitrogen gas passes, so-called cross-leaks through the fuel electrode from the air electrode of the fuel cell 2 via the ion exchange film, whereby the gas is included in the circulation gas. The circulation gas meets the supply gas at the joining part A to be supplied to the fuel cell 2.

The "combined gas" is a gas produced after the supply gas meets the circulation gas at the joining part A, and flows through a portion of the supply path 22 from the joining part A to the fuel gas inlet 8.

The pump 24 (a circulation device) feeds the circulation gas in the circulation path 23 under pressure to the supply path 22. The pump 24 may be constituted of various types, and is constituted of, for example, a volume type. The pump 24 includes, for example, a three-phase alternating-current motor (not shown), and a compressor portion having an impeller connected to a driving shaft of the motor. Driving, stop and rotation number of the motor are controlled by the control device 7. In the pump 24, the rotation number of the motor can be controlled to control the rotation number of the impeller, so that a flow rate of the circulation gas to be fed under pressure to the joining part A can be controlled.

The purge path 25 is branched and connected to the circulation path 23. The purge path 25 is provided with a purge valve 33 as a shutoff valve. When the fuel cell system 1 is operated, the purge valve 33 appropriately opens, whereby impurities in the circulation gas are discharged together with the hydrogen off-gas to a hydrogen diluter (not shown). When the purge valve 33 opens, a concentration of the impurities in the circulation gas drops and a concentration of hydrogen in the circulation gas increases. Here, the impurities in the circulation gas include the above-mentioned nitrogen gas in addition to water content such as the produced water contained in the circulation gas.

A plurality of temperature sensors 61, 62 and pressure sensors 63, 64 are disposed in the fuel gas piping system 4. The temperature sensor 61 is disposed along the supply path 22 on the upstream side of the joining part A, and detects a temperature of the supply gas. The temperature sensor 62 is disposed along the circulation path 23, and detects a temperature of the circulation gas. The pressure sensor 63 is disposed along the supply path 22 on the downstream side of the joining part A, and detects a pressure of the combined gas. The pressure sensor 64 is disposed along the circulation path 23, and detects a pressure of the circulation gas. It is to be noted that another temperature sensor and another pressure sensor may be disposed in the fuel gas piping system 4 and design of the number and positions of the sensors may appropriately be changed. For example, various sensors which detect the pressure of the supply gas, the pressure of the circulation gas and the temperature of the combined gas may be disposed.

The refrigerant piping system 5 supplies a refrigerant to the fuel cell 2 to cool the fuel cell 2. The refrigerant piping system 5 has a refrigerant channel 41, a cooling pump 42, a radiator 43, a bypass channel 44 and a changeover valve 45. The refrigerant channel 41 communicates with a cooling channel 2c in the fuel cell 2. The refrigerant channel 41 has a temperature sensor 46 disposed in the vicinity of a refrigerant inlet of the fuel cell 2, and a temperature sensor 47 disposed in the vicinity of a refrigerant outlet of the fuel cell 2. The refrigerant temperature to be detected by the temperature sensor 47 reflects an inner temperature of the fuel cell 2 (hereinafter referred to as the temperature of the fuel cell 2). The cooling pump 42 is disposed along the refrigerant channel 41. The radiator 43 cools the refrigerant discharged from the fuel cell 2. The bypass channel 44 bypasses the radiator 43. The changeover valve 45 sets circulation of cooling water through the radiator 43 and the bypass channel 44.

The control device 7 generally controls the whole system. The control device 7 is constituted as a microcomputer in which a CPU, a ROM and a RAM are incorporated. The CPU executes desired calculation according to a control program to perform various processing and control such as control of the pump 24 described later. The ROM stores the control program and control data to be processed by the CPU, and stores a circulation ratio described later. The RAM is used as various operation areas mainly for control processing. The control device 7 inputs detection signals of various temperature sensors 46, 47, 61 and 62 and the pressure sensors 63, 64 for use in the gas systems (3, 4) and the refrigerant system 5, and an outside air temperature sensor 51 for detecting an outside air temperature at which the fuel cell system 1 is installed and the like, and the control device outputs control signals to various constituting elements such as the pump 24.

Next, a method for calculating circulation ratio in the fuel cell system 1 according to the present embodiment will be described with reference to FIGS. 2 and 3.

The "circulation ratio" is a ratio of a flow rate of the circulation gas to that of the supply gas, and is defined by the following equation (1):

$$C_{RE} = M_{RE}/M_{SUP} \qquad (1),$$

in which $C_{RE}$ is the circulation ratio, $M_{RE}$ is the flow rate of the circulation gas and $M_{sup}$ is the flow rate of the supply gas. It is to be noted that consumption of the hydrogen gas in the fuel cell 2 accompanying power generation of the fuel cell 2 agrees with the flow rate $M_{sup}$ of the supply gas.

Usually, a temperature of the supply gas in the hydrogen gas supply source 21 drops owing to insulating expansion accompanying the gas consumption. Therefore, when the fuel cell system 1 is operated under a low-temperature environment, for example, at the outside air temperature below a freezing point, the temperature of the supply gas drops below the freezing point. On the other hand, the circulation gas has a temperature close to the operation temperature of the fuel cell 2 in a range of, for example, 60 to 70° C. When the supply gas joins the circulation gas at the joining part A, the temperature of the supply gas is raised by the circulation gas, whereas the hydrogen off-gas and the water vapor in the circulation gas are cooled by the supply gas. When the temperature of the combined gas drops below a solidifying point of water, the water vapor in the circulation gas is condensed to constitute water, and then turns into ice.

Figure 2:
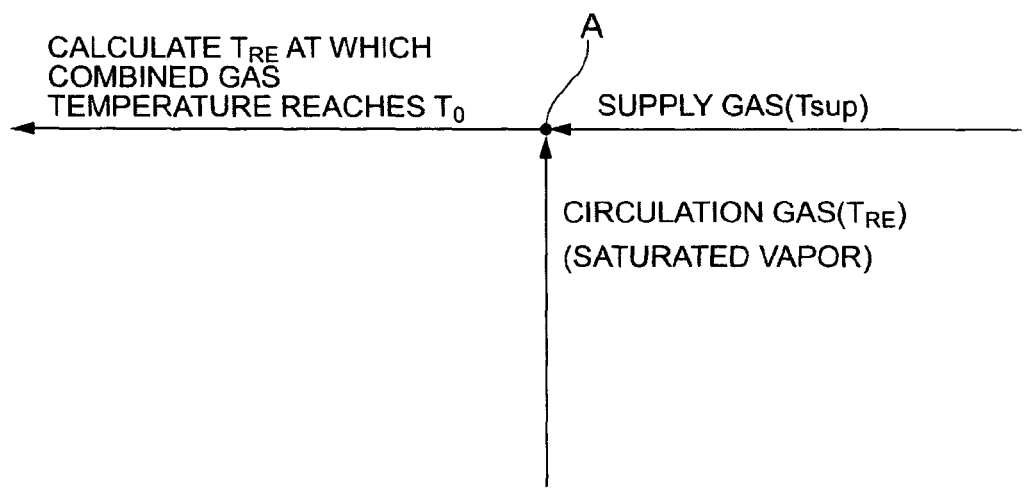
FIG. 2 is a diagram showing a calculation model for use in a method for calculating circulation ratio in the fuel cell system according to the present invention.

The present inventor has noted heat balance at the joining part A, and has created a calculation model shown in FIG. 2 in order to calculate the circulation ratio $C_{RE}$ appropriate for the fuel cell system 1, specifically the circulation ratio $C_{RE}$ at which the water vapor in the circulation gas does not finally turn into the ice. In the calculation model, it is assumed that an amount of heat to be received which is required for the supply gas to reach a combined gas temperature $T_0$ at the joining part A is equal to a value obtained by adding, to an amount of the heat to be discharged at a time when the circulation gas reaches the combined gas temperature $T_0$, condensation latent heat at a time when all the water vapor in the circulation gas turns into water.

Therefore, in this calculation model, assuming that the flow rate of the supply gas at the joining part A is 1 (one) and that the flow rate of the circulation gas is $C_{RE}$, the heat balance at the joining part A can be calculated as represented by the following equation (2):

$$(T_0 - T_{Sup}) \times 1 \times Cp_{(H2)} = (T_{RE} - T_0) \times C_{RE} \times Cp_{(H2/H2O/N2)} + Q \times C_{RE} \times (P_{[T]}/P_{RE}) \quad (2),$$

in which the used symbols are as follows:

$T_{Sup}$: a temperature [° C.] of the supply gas;
$T_{RE}$: a temperature [° C.] of the circulation gas;
$T_0$: a temperature [° C.] of the combined gas;
$Cp_{(H2)}$: a constant-pressure molar specific heat [kJ/kmol·K] of hydrogen;
$Cp_{(H2/H2O/N2)}$: an average constant-pressure molar specific heat [kJ/kmol·K] of the circulation gas;
Q: a condensation latent heat [kJ/g] of water vapor;
$P_{[T]}$: a saturated water vapor pressure [kPa] at the circulation gas temperature $T_{RE}$; and
$P_{RE}$: a pressure [kPa] of the circulation gas.

A second term "$Q \times C_{RE} \times (P_{[T]}/P_{RE})$" of a right side of the equation (2) indicates the condensation latent heat at a time when all of the water vapor in the circulation gas turns into water.

Here, the latent heat Q differs with the circulation gas temperature $T_{RE}$, but, for example, the temperature of the fuel cell 2 or the maximum temperature of the circulation gas temperature $T_{RE}$ may be set to a reference. A reason for this is that the higher the temperature is, the lower the latent heat Q becomes, and the calculation can therefore be performed on a safety side from a viewpoint of inhibition of freezing. For example, when the temperature of the fuel cell 2 has a maximum value of 70° C., the latent heat indicates 2.331 kJ/g, and this unit is therefore converted into a value of the latent heat Q. In the present embodiment, the latent heat at 70° C. was substituted into the latent heat Q of the equation (2) to calculate the equation.

The saturated water vapor pressure $P_{[T]}$ differs with the circulation gas temperature $T_{RE}$, but the circulation gas temperature $T_{RE}$ is, for example, 60 to 70° C. as described above. In the present embodiment, the saturated water vapor pressure at 70° C. was substituted into the saturated water vapor pressure $P_{[T]}$ of the equation (2) to calculate the equation.

The circulation gas pressure $P_{RE}$ corresponds to an outlet pressure of the fuel cell 2. The circulation gas pressure $P_{RE}$ fluctuates with a load of the fuel cell 2 in the same manner as in the supply gas pressure, reaches, for example, a pressure $P_1$ at a high load, and reaches a pressure $P_2$ lower than the pressure $P_1$ at a low load. In the present embodiment, these pressures $P_1$ and $P_2$ were substituted into the circulation gas pressure $P_{RE}$ of the equation (2) to calculate the equation.

It is assumed in the above-mentioned calculation model that the specific heat of water is that of water vapor. The reason is that the specific heat of a gas is smaller than that of a liquid, and the calculation can therefore be performed on the safety side from the viewpoint of the inhibition of the freezing. It is also assumed that the specific heat is that of an ideal gas. The reason is that there is scarcely a difference due to the temperature.

Furthermore, it is assumed in the calculation model that the circulation gas is saturated vapor. It is also assumed that the heat received from a pipe at the joining part A is not considered, and the calculation is performed on the safety side from the viewpoint of the inhibition of the freezing. It is to be noted that the average molar specific heat $Cp_{(H2/H2O/N2)}$ of the circulation gas is an average of constant-pressure molar specific heat of hydrogen, water vapor and nitrogen, but a difference of the molar specific heat between these gases is small, and therefore the constant-pressure molar specific heat of hydrogen may be used in $Cp_{(H2/H2O/N2)}$ in another embodiment.

Moreover, in the above-mentioned calculation model, the temperature $T_0$ of the combined gas may be set to the solidifying point of water at the pressure of the combined gas. The pressure of the combined gas fluctuates with the load of the fuel cell 2. However, when the pressure is, for example, 200 kPa as described above, a pressure value is larger than 101.3 kPa (nearly equals 760 mmHG), and the solidifying point of water at this pressure is therefore lower than 0° C. In consequence, the water solidifying point lower than 0° C. may be substituted into the combined gas temperature $T_0$ of the equation (2).

However, in the present embodiment, 0° C. was substituted into the combined gas temperature $T_0$ of the equation (2) to calculate the equation. The reason is that the combined gas temperature $T_0$ is set to 0° C. higher than the solidifying point of water at the combined gas pressure, whereby the calculation can be performed on the safety side from the viewpoint of the inhibition of the freezing. Assuming that $T_0=0$ in the equation (2), the following equation (3) results.

$$-T_{Sup}Cp_{(H2)} = T_{RE}C_{RE}Cp_{(H2/H2O/N2)} + QC_{RE}(P_{[T]}/P_{RE}) \quad (3).$$

Then, it was assumed that a circulation ratio $C_{RE}$ was a variable in the equation (3), and the circulation gas temperature $T_{RE}$ at a time when the combined gas temperature was 0° C. was calculated. Here, there was assumed a case where the fuel cell system 1 or a vehicle on which this system 1 was mounted was installed in an environment at a certain low temperature (e.g., −20° C.), and four combinations of the supply gas temperature $T_{Sup}$ and the circulation gas pressure $P_{RE}$ were calculated. Calculation results of the four combinations are shown by curved lines L1 to L4 in FIG. 3.

The curved line L1 is a case where $(T_{Sup}, P_{RE})=(T_1, P_1)$.
The curved line L2 is a case where $(T_{Sup}, P_{RE})=(T_1, P_2)$.
The curved line L3 is a case where $(T_{Sup}, P_{RE})=(T_2, P_1)$.
The curved line L4 is a case where $(T_{Sup}, P_{RE})=(T_2, P_2)$.
It is to be noted that $T_1 < T_2$ and $P_1 > P_2$.

Here, the temperature $T_1$ is a supply gas temperature during a continuous operation of the fuel cell system 1, and is, for example, a temperature sufficiently lower than −20° C. The temperature $T_2$ is a supply gas temperature during starting of the fuel cell system 1, and is, for example, a temperature close to −20° C. It is to be noted that during the continuous operation of the fuel cell system 1, the fuel cell 2 generates the power, and a vehicle can run owing to the generated power.

Figure 3:
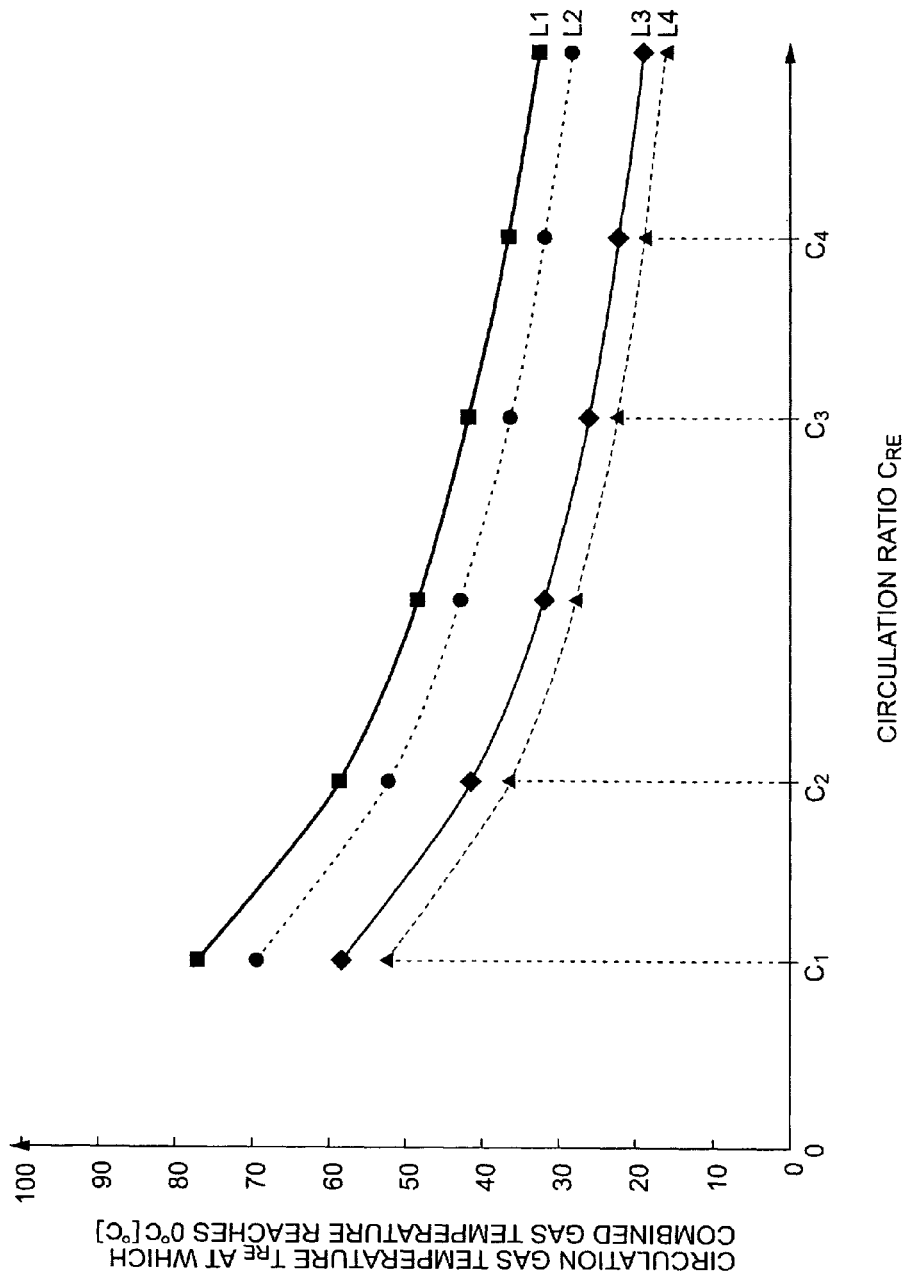
FIG. 3 is a graph showing a result of calculation using the calculation model of FIG. 2, and showing a relation between a circulation ratio and a circulation gas temperature.

FIG. 3 will be analyzed. First, the curved line L1 is noted. The combined gas temperature exceeds 0° C. in an area on the upside of the curved line L1 and is below 0° C. in an area on the downside of the curved line L1. This also applies to the other curved lines L2 to L4, the combined gas temperature exceeds 0° C. in an area on the upside of each of the curved lines L2 to L4, and the combined gas temperature drops below 0° C. in an area on the downside of each of the curved lines L2 to L4.

Moreover, when the curved lines L1 and L2 are noted, at the arbitrary circulation ratio $C_{RE}$, the curved line L1 having a higher circulation gas pressure $P_{RE}$ requires a high circulation gas temperature $T_{RE}$ so as to achieve the combined gas temperature of 0° C. Furthermore, when the curved lines L1 and L3 are noted, at the arbitrary circulation ratio $C_{RE}$, the curved line L1 having a lower supply gas temperature $T_{Sup}$ requires a high circulation gas temperature $T_{RE}$ so as to achieve the combined gas temperature of 0° C.

Here, a case where the circulation ratio $C_{RE}$ is one of circulation ratios $C_1$ to $C_4$ will be investigated. It is to be noted that there is a relation of $C_1 < C_2 < C_3 < C_4$.

As shown by the curved lines L1 and L2, when the circulation ratio is $C_1$, the circulation gas temperature $T_{RE}$ is required to be about 70° C. or more so that the combined gas temperature of 0° C. or more is achieved. However, since the circulation gas temperature $T_{RE}$ is in a range of 60 to 70° C. as described above, this requirement cannot be satisfied. That is, assuming that the circulation ratio $C_{RE}$ is set to $C_1$ in the low-temperature environment of −20° C., the combined gas temperature drops below 0° C. during the continuous operation of the system 1, and resultantly the water vapor in the circulation gas finally freezes at the joining part A. In consequence, it is seen that the circulation ratio $C_{RE}$ cannot be set to the circulation ratio $C_1$.

When the circulation ratio is $C_2$, the circulation gas temperature $T_{RE}$ for achieving the combined gas temperature of 0° C. or more is required to be about 52° C. or more on conditions of the curved line L2, and required to be about 59° C. or more on conditions of the curved line L1. Considering that the circulation gas $T_{RE}$ is in a range of 60 to 70° C., the circulation ratio $C_{RE}$ may be set to $C_2$.

However, as described above, on the conditions of the curved line L1, the circulation gas pressure $P_{RE}$ is high, that is, the fuel cell 2 can have a high load as compared with the conditions of the curved line L2. To set the circulation ratio $C_{RE}$ to $C_2$, it can be said that there is room during the continuous operation of the fuel cell 2 at the low load, but it cannot be said that there is room during the continuous operation (e.g., during high-speed running) of the fuel cell 2 at the high load. Especially, it is seen that when the environment has a low temperature lower than −20° C., the curved lines L1 and L2 move in parallel upwards, therefore the freezing at the joining part A cannot be avoided, and the circulation ratio $C_{RE}$ cannot be set to $C_2$.

When the circulation ratio is $C_3$, the circulation gas temperature $T_{RE}$ for achieving the combined gas temperature of 0° C. or more is required to be about 41° C. or more on the conditions of the curved line L1. Since the circulation gas temperature $T_{RE}$ is in a range of 60 to 70° C., it can be judged that the freezing at the joining part A can be avoided during the continuous operation of the system 1 even if the circulation ratio is set to $C_3$.

Moreover, when the circulation ratio is $C_3$, the circulation gas temperature $T_{RE}$ for achieving the combined gas temperature of 0° C. or more is required to be about 25° C. or more on the conditions of the curved line L3. That is, when the circulation ratio is $C_3$, the circulation gas temperature $T_{RE}$ is required to be about 25° C. in order to inhibit the freezing during the starting of the system 1. However, during the starting of the system 1, the circulation gas temperature $T_{RE}$ does not sufficiently rise, and does not reach about 25° C. However, with the circulation gas at 30° C. or less, since a very small amount of water vapor is included in the circulation gas, it can be judged that closing of the supply path 22 due to the freezing of dew condensation water during the rising of the temperature can be avoided. Therefore, it can be judged that even when the circulation ratio is set to $C_3$, occurrence of the closing of the channel due to the freezing at the joining part A during the starting of the system 1 can be avoided.

When the circulation ratio is set to $C_4$, the required value of the circulation gas temperature $T_{RE}$ is relaxed (reduced) as compared with the circulation ratio $C_3$. Therefore, even when the circulation ratio is set to $C_4$, the closing of the channel due to the freezing at the joining part A can be avoided during the starting and the continuous operation of the system 1. However, when the circulation ratio $C_{RE}$ is large, the rotation number of the pump 24 (the motor rotation number or the impeller rotation number) is large, and the power consumption of the pump 24 is large. As a result, when the circulation ratio $C_{RE}$ is excessively large, an efficiency of the whole fuel cell system 1 drops. From the above-mentioned considerations, it can be derived that a target value of the circulation ratio $C_{RE}$ may be set to, for example, $C_3$ at which the freezing at the joining part A can be inhibited and at which the efficiency of the whole fuel cell system 1 is not impaired.

According to the above-mentioned method for calculating the circulation ratio $C_{RE}$ in the present embodiment, since the condensation latent heat of the water vapor in the circulation gas is considered in the calculation of the heat balance at the joining part A, the heat balance at the joining part A can correctly be calculated. Moreover, based on the result of the heat balance calculation, the circulation ratio $C_{RE}$ at which the closing of the channel due to the freezing of the water vapor at the joining part A can be avoided can be set to such a value that the efficiency of the whole system 1 is not impaired. Therefore, even during the operation of the fuel cell system 1 below the freezing point, the freezing at the joining part A can be inhibited, and an external heater for exclusive use in inhibiting the freezing or the like does not have to be installed at the joining part A.

In another embodiment, the control device 7 may vary the circulation ratio $C_{RE}$, depending on a situation of the fuel cell system 1. For example, when the water content freezes at the joining part A, the circulation ratio $C_{RE}$ may be changed. In this case, it is preferable to change the circulation ratio $C_{RE}$ so that the water content frozen at the joining part A is unfrozen, and it is preferable to increase the circulation ratio $C_{RE}$. Similarly, when the freezing at the joining part A is expected, the circulation ratio $C_{RE}$ may be changed. In this case, it is preferable to change the circulation ratio $C_{RE}$ so that the freezing does not occur at the joining part A, and it is preferable to increase the circulation ratio $C_{RE}$. It is to be noted that when the circulation ratio $C_{RE}$ is increased, it is meant that the flow rate $M_{RE}$ of the circulation gas increases.

The control device 7 can judge, based on, for example, the power consumption of the pump 24 and the pressure of the supply path 22, whether or not the freezing of the water content occurs at the joining part A and whether or not there is a possibility of the freezing of the water content. For example, when the power consumption of the pump 24 is larger than a predetermined threshold value, it is judged that the water content freezes at the joining part A.

When the circulation ratio $C_{RE}$ is varied, an upper limit value of the circulation ratio $C_{RE}$ may be determined in consideration of the efficiency of the whole system 1, and a lower limit value of the circulation ratio $C_{RE}$ may be determined in consideration of the freezing of the water vapor. For example, the upper limit value of the circulation ratio $C_{RE}$ may be set to $C_4$, and a lower limit value may be set to $C_2$ or $C_3$. The circulation ratio $C_{RE}$ to be varied during the freezing of the water content at the joining part A or at a time when the freezing is expected may be described based on the load of the fuel cell 2 and a state of the supply gas (e.g., the supply gas temperature $T_{Sup}$). For example, when the fuel cell 2 has the high load, the circulation ratio $C_{RE}$ may be increased as compared with the low load. When the supply gas temperature $T_{Sup}$ is low, the circulation ratio $C_{RE}$ may be increased as compared with a case where the temperature is high.

The circulation ratio $C_{RE}$ may be varied by controlling the pump 24. For example, the circulation ratio $C_{RE}$ of the pump 24 may be varied based on at least one of the supply gas temperature $T_{Sup}$, the circulation gas pressure $P_{RE}$ and an outside air temperature, and the circulation ratio $C_{RE}$ may appropriately be set based on these elements ($T_{Sup}$, $P_{RE}$ and the outside air temperature) including the upper limit value and the lower limit value of the circulation ratio $C_{RE}$. Therefore, in the fuel cell system 1, data of the circulation ratio $C_{RE}$ corresponding to the conditions of the supply gas temperature $T_{Sup}$, the circulation gas pressure $P_{RE}$ and the outside air temperature may be stored as a map in the ROM of the control device 7.

Then, in the fuel cell system 1, during the starting or the operation, at least one of the supply gas temperature $T_{Sup}$, the circulation gas pressure $P_{RE}$ and the outside air temperature may be detected by a sensor, and an optimum circulation ratio $C_{RE}$ may be read from the ROM based on the detection result to set or change the circulation ratio to $C_{RE}$. Here, the supply gas temperature $T_{Sup}$ may be detected by, for example, the temperature sensor 61, the circulation gas pressure $P_{RE}$ may be detected by, for example, the pressure sensor 64 and the outside air temperature may be detected by the outside air temperature sensor 51.

Industrial Applicability

A fuel cell system 1 of the present invention can be mounted on other mobile members such as a two-wheeled or more vehicle, a train, an airplane, a boat and a robot in addition to the above-mentioned vehicle. The fuel cell system 1 may be of a fixed type, and can be incorporated in a cogeneration system. In the above-mentioned example, a circulation ratio of an anode-system (fuel-system) gas has been described, but needless to say, the present embodiment is applicable to calculation of the circulation ratio of a cathode-system (oxide gas system) gas.

The invention claimed is:

1. A fuel cell system comprising:
    a fuel cell;
    a gas supply source of a supply gas;
    a supply path for supplying the supply gas from the gas supply source to the fuel cell;
    a control device that controls the fuel cell system;
    a circulation path for returning a circulation gas discharged from the fuel cell to the supply path;
    a joining part at which the supply gas meets the circulation gas; and
    a circulation device configured to control the flow rate of the circulation gas to be fed to the joining part,
    wherein the control device is programmed to set a flow rate of the circulation gas with respect to that of the supply gas in consideration of condensation latent heat of water vapor in the circulation gas, so that a temperature of a combined gas constituted by combining the supply gas and the circulation gas is higher than a predetermined temperature.

2. The fuel cell system according to claim 1, wherein the fuel cell includes an air electrode and a fuel electrode,
    the gas supply source is a gas supply source of a fuel system, and
    the supply gas and the circulation gas are supplied to the fuel electrode.

3. The fuel cell system according to claim 1, wherein the control device is further programmed to set the flow rate of the circulation gas with respect to that of the supply gas by calculation of heat balance at the joining part in consideration of the condensation latent heat.

4. The fuel cell system according to claim 1, wherein the predetermined temperature is a water solidifying point at a pressure of the combined gas or more.

5. The fuel cell system according to claim 1, wherein the predetermined temperature is 0° C.

6. The fuel cell system according to claim 1, wherein the control device is further programmed to set a lower limit value of the flow rate of the circulation gas with respect to that of the supply gas in consideration of the condensation latent heat.

7. The fuel cell system according to claim 1, wherein the circulation device varies the flow rate of the circulation gas with respect to that of the supply gas based on at least one of a temperature of the supply gas, a pressure of the circulation gas and an outside air temperature.

8. The fuel cell system according to claim 1, wherein the fuel cell includes a gas inlet and a gas outlet,
    the supply path extends from the gas supply source to the gas inlet, and
    the circulation path extends from the gas outlet to the joining part.

* * * * *

UNITED STATES PATENT AND TRADEMARK OFFICE
CERTIFICATE OF CORRECTION

PATENT NO. : 8,383,279 B2
APPLICATION NO. : 12/085905
DATED : February 26, 2013
INVENTOR(S) : Yoshiaki Naganuma It is certified that error appears in the above-identified patent and that said Letters Patent is hereby corrected as shown below:

In the Specifications:

In column 1, line 7, change "10May" to --10 May--;

In column 7, line 37, change " $Q \times C_{RE} \times (P_{[T]}/P_{RE})$ " to -- $Q \times C_{RE} \times (P_{[T]}/P_{RE})$ --.

Signed and Sealed this
Thirteenth Day of August, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,383,279 B2  
APPLICATION NO. : 12/085905  
DATED : February 26, 2013  
INVENTOR(S) : Yoshiaki Naganuma Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1180 days.

Signed and Sealed this

First Day of September, 2015

Michelle K. Lee  
*Director of the United States Patent and Trademark Office*